United States Patent [19]
Ward

[11] Patent Number: 4,534,060
[45] Date of Patent: Aug. 6, 1985

[54] METHOD AND APPARATUS FOR REMOVING NOISE AT THE ENDS OF A STROKE

[75] Inventor: Jean R. Ward, Arlington, Mass.

[73] Assignee: Pencept, Inc., Waltham, Mass.

[21] Appl. No.: 521,729

[22] Filed: Aug. 9, 1983

[51] Int. Cl.³ .............................................. G08C 25/00
[52] U.S. Cl. ...................................... 382/54; 382/13; 178/18
[58] Field of Search .................... 178/18, 19, 20, 21; 364/724, 518, 520; 382/13, 23, 34, 45, 54

[56] References Cited

U.S. PATENT DOCUMENTS

| | | | |
|---|---|---|---|
| 4,284,975 | 8/1981 | Odaka | 340/146.3 |
| 4,319,331 | 3/1982 | Elbaum et al. | 178/19 |
| 4,375,081 | 2/1983 | Blesser | 340/146.3 |

OTHER PUBLICATIONS

Fast Generation of Chain Code, B. G. Batchelor, B. K. Marlow, IEE Proc., vol. 27, Pt. E., No. 4, Jul. 1980.

*Primary Examiner*—Stafford D. Schreyer
*Attorney, Agent, or Firm*—Robert M. Asher

[57] ABSTRACT

A method and apparatus are described for processing a series of digital signals representing a stroke of a stylus on a tablet to minimize noise at the ends of the stroke, the series of signals corresponding to the X and Y coordinates of a series of points along the direction of travel of the stroke. First the signals for the X and Y coordinates of each point in the series are compared to the signals for the X and Y coordinates of the points adjacent to it to form a second series of signals comprising only those signals having an ordinate value more extreme than the corresponding ordinate value of its adjacent points. The first point in the second series of signals is then compared with points succeeding the first point to identify the point in the second series that is furthest from the first point but within a predetermined distance from the first point. The point so located is identified as the end point at that end of the stroke. The end point for the other end of the stroke is identified in a similar manner using the second series of points but starting with the last point in the series and comparing it with preceeding points. A third series of signals are then generated, using the end points so identified as the first and last points and all points between the two end points from the first series as intermediate points.

9 Claims, 4 Drawing Figures

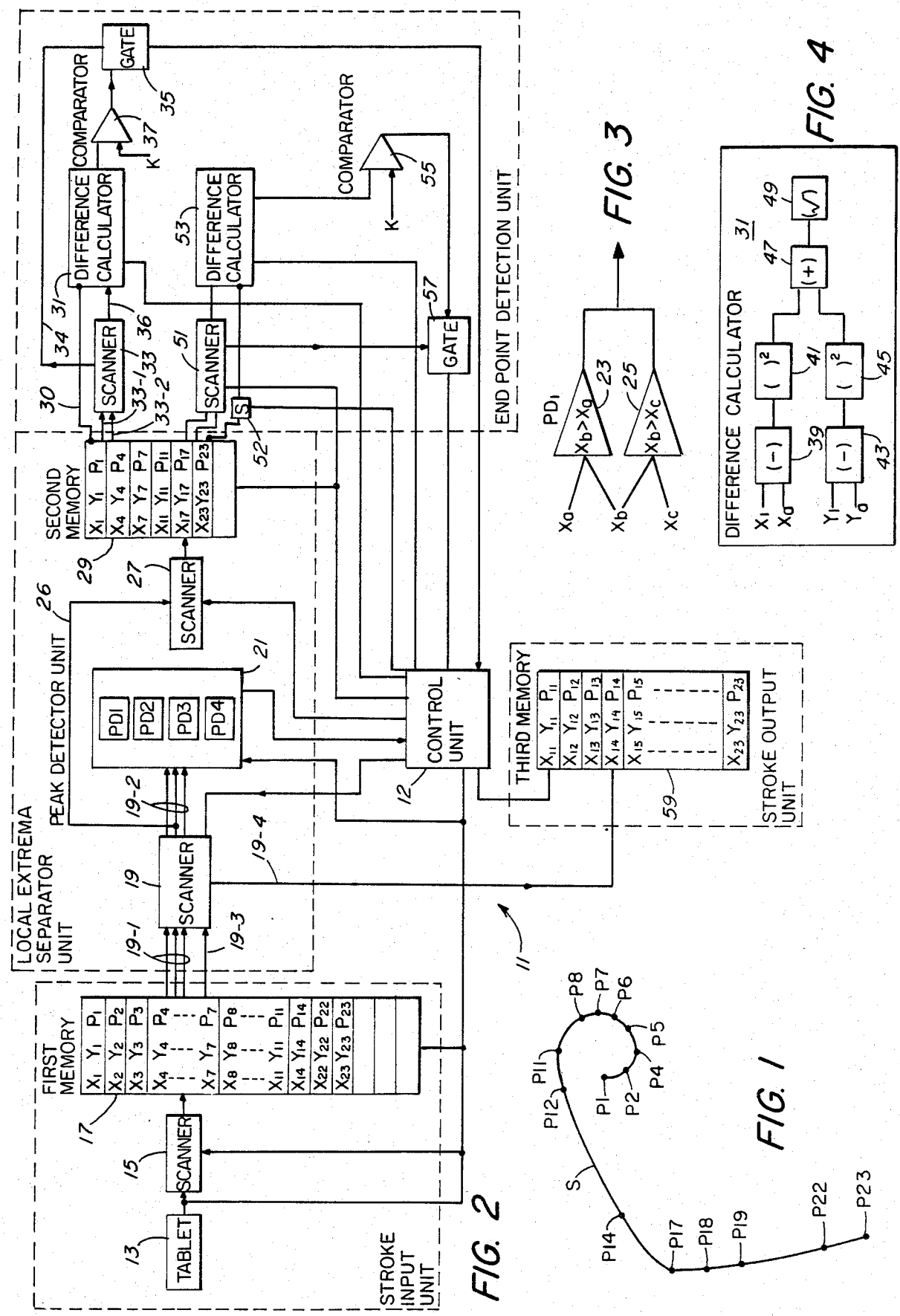

METHOD AND APPARATUS FOR REMOVING NOISE AT THE ENDS OF A STROKE

BACKGROUND OF THE INVENTION

The present invention relates generally to signal processing systems and more particularly to a method and apparatus for processing a series of digital signals representing a stroke of a writing instrument such as a stylus on a writing surface such as a digitizing tablet to minimize noise at the ends of the stroke.

In many applications a digitizing tablet is used to convert the pen or stylus motion into a set of electrical data which is then processed by digital equipment. Typically, there is a special electronic or electromagnetic surface, which detects the x and y positions of the pen as it moves along the surface at a periodic rate. The information is present as two digital data words at a periodic clock rate. This class of technology is used for signature verifications, automatic drafting, character recognition and so forth. In each case, the user writes on the writing surface with the writing instrument and the position is monitored electronically.

In connecting such a device directly to a processing system there are problems because the raw data contains certain kinds of noise or other defects which can adversely affect applications that process the hand drawn data for editing or character recognition or that produce electronic drafting drawings. The noise may be electrical or mechanical noise produced by the equipment employed to generate the sequence of signals corresponding to the stroke of the writing instrument. The noise may also be natural noise produced by the writer when he is writing slowly relative to the rate at which data is sampled or when he pauses or halts at the ends of the stroke. This latter type of noise is often referred to as hand wobble.

In U.S. Pat. No. 4,375,081 to B. Blesser there is described a technique for removing or minimizing noise over the length of a stroke caused by writing slowly. The technique comprises filtering a signal represented by a first series of indicia wherein each indicium of the series represents an amplitude by serially averaging the amplitudes of sets of n indicia of the series to form a second series of indicia and serially amplitude comparing each subsequently occurring indicium of the second series with a previously occurring indicium thereof to form a third series of indicia which includes those indicia resulting from comparisons having an amplitude difference greater than a predetermined amount.

In U.S. Pat. No. 4,284,975 to K. Odaka there is disclosed a pattern recognition system for hand-written characters operating on an on-line basis comprising a character input unit for providing the coordinates of a plurality of points on strokes of a hand-written input character, an approximate unit for providing some feature points for each stroke of the input character, a pattern difference calculator for providing the sum of the length between the feature points of the input character and those of the reference characters which are stored in the reference pattern storage, and a minimum difference detector for determining the minimum value of the difference among the pattern differences thus calculated and determining the input character as the reference character which provides the minimum difference.

It is an object of this invention to provide a new and improved technique for processing a series of signals representing a stroke of a writing instrument on a surface to remove or minimize noise at the start and finish of the stroke.

It is another object of this invention to provide a new and improved technique for processing a series of signals representing a stroke of a writing instrument on a surface to remove or minimize noise at the start and finish of the stroke caused by wobble.

It is a still another object of this invention to provide a new and improved technique for processing a series of signals representing a stroke of a writing instrument on a surface to remove or minimize noise at the start and finish of the stroke which does not involve averaging.

It is yet still another object of this invention to provide a new and improved technique for processing a series of signals representing a stroke of a writing instrument on a surface to remove or minimize noise at the start and finish of the stroke which is not dependent on the rate at which the signals representing points along the stroke are sampled and does not require that the points be uniformly spaced from one another.

It is a further object of the invention to provide a technique as described above which does not alter the signals between the points determined to be the end points.

SUMMARY OF THE INVENTION

A method of processing a series of electrical signals representing a stroke of a writing instrument on a recording medium to minimize signals caused by noise at the start and finish of the stroke according to the teachings of the present invention comprises comparing the signals in the series relative to each other to form a second series of signals, the second series of signals comprising only signals corresponding to local extrema points of the stroke, comparing the first signal in the second series with each succeeding signal in the second series to identify the furthest signal from the first signal that is within a predetermined distance from said first signal, the signal so identified constituting the end point at that end of the stroke, comparing the last signal in the second series with each preceeding signal in the second series to identify the furthest signal from said last signal that is within a predetermined distance from said last signal, the signal so identified constituting the end point at the other end of the stroke, and forming a third series of signals from the first series of signals starting with signal corresponding to the processed end point at one end of the stroke and terminating with the signal corresponding to the processed end point at the other end of the stroke.

An apparatus for processing a series of electrical signals representing a stroke of a writing instrument on a recording medium to minimize signals caused by noise at the start and finish of the stroke according to the teachings of the present invention comprises means for comparing said signals in the series relative to each other to form a second series of signals, the second series of signals comprising only signals corresponding to local extrema points of the stroke, means for comparing the first signal in the second series with each succeeding signal in said second series to identify the furthest signal from the first signal that is within a predetermined distance from the first signal, the signal so identified constituting the end point at that end of the stroke, means for comparing the last signal in the second series with each preceeding signal in the second series to identify the furthest signal from the last signal that is within a predetermined distance from the last signal, the signal so identified constituting the end point at the other end of the stroke, and means for forming a third series of signals from the first series of signals starting with signal corresponding to the processed end point at one end of the stroke and terminating with the signal corresponding to the processed end point at the other end of the stroke.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

FIG. 1 is an example of a stroke useful in explaining the invention.

FIG. 2 is a block diagram of a system constructed according to the teachings of the present invention;

FIG. 3 is a block diagram of one of the peak detectors in the peak detector unit shown in FIG. 2; and FIG. 4 is a block diagram of one of the difference calculators shown in FIG. 2.

DETAILED DESCRIPTION OF PREFERRED EMBODIMENTS

The present invention is directed to a technique for processing a series of signals representing a stroke of a writing instrument on a writing surface to remove or minimize signals at the start and finish of the stroke which are caused by noise. The invention accomplishes this by first determining the local extrema points of the stroke and then determining the local extrema point at each end of the stroke which is furthest from first local extrema point at that end of the stroke but within a predetermined distance from the first local extrema point at that end of the stroke. The local extrema point so identified at the start of the stroke is utilized as the end point for that end of the stroke and the local extrema point so identified at the finish of the stroke is utilized as the end point for that end of the stroke. Points before the local extrema point at one end of the stroke and after the local extrema point at the other end of the stroke are discarded as noise. A new series of signals is then generated starting with the signal corresponding to the local extrema point at one end of the stroke, using all intermediate points, and terminating with the signal corresponding to the local extrema point at the other end of the stroke.

Although the invention will hereinafter be described in connection with processing a series of digital signals produced by the stroke of a stylus on a digitizing tablet it it to be understood that the invention may also be used in connection with processing a series of analog signals representative of the stroke of a writing instrument on a surface and that the series of signals representing points along the stroke may be obtained by other means, such as electro-optically (using a light pen or a laser beam and a photo-conductive surface) rather than electronically.

Referring now to the drawings there is illustrated in FIG. 1 an example of a stroke S useful in explaining the invention. The stroke is represented by twenty-three positions or points. For simplicity only some of the points are shown and labelled. P1 is the point at one end of the stroke which will be considered the first or starting end of the stroke and P23 is the point at the other end of the stroke which will be considered the second or finishing end of the stroke. The present invention provides a technique for determining which point at the start of the stroke should be used as the end point of the start of the stroke and which point at the finish of the stroke should be used as the end point at the finish of the stroke.

Referring now to FIG. 2, there is illustrated a system utilizing the teachings of the present invention and identified generally by reference numeral 11.

System 11 includes a control unit 12 which controls the overall operation of system 11. A digitizing tablet 13 labelled by reference numeral 13 periodically emits two dimensional digital values representing the X and Y positions of a stylus making a stroke across its surface. Thus $X_1$ and $Y_1$ represent the X and Y coordinates of the stylus at the first point $P_1$ of the stroke, $X_2$ and $Y_2$ represent the X and Y coordinates of the second point P2 of the stroke, X3 and Y3 represent the X and Y coordinates of the third point P3 of the stroke and so forth.

The points representing the stroke are preferably uniformly spaced from one another, either temporally or spatially.

The digital signals corresponding to the X and Y values of each point P1 through P23 are stored in succession by a scanner 15 into successive locations in a first memory 17, which may be a random access type memory. Thus, point P1 is stored in the first location, point P2 is stored in the second location and point P3 is stored in the third location and so forth.

The data stored in first memory 17 is fed in succession by a second scanner 19 into a peak detector unit 21 which processes the data to identify the signals corresponding to those points which are identified as local extrema points.

The implementation of peak detector unit 21 is dependent on the definition used for a local extrema point and the points identified by peak detector unit 21 as local extrema points may be different for different definitions of a local extrema point.

A local extrema point may be defined as a point along the stroke having a more extreme value (in either the X or the Y ordinate) than either one of the points adjacent to it. As can be appreciated, first point in the stroke will always be one of the local extrema points since both of its ordinates are greater than the ordinates of point preceeding it (since there is no point preceeding it). Similarly, the last point in the stroke will also always be one of the local extrema points since both of its ordinates are greater than the ordinates of the point following it (since there is no point following it). As another definition, a local extrema may be identified as a point which is at a greater radial distance from the point at one end of the stroke than the points on either side of it. The first and last points will also always be local extrema points under this definition.

In the embodiment shown the first definition of a local extrema point is employed.

Scanner 19 scans the locations in memory 17 successively, three locations at a time, except in the first and last instances, and feeds the data scanned into peak detector unit 21. Scanner 19 has three input legs 19-1 which are ganged together and three output legs 19-2 which are also ganged together. Each one of the input legs 19-1 has three ganged contact elements. One element scans the cells in memory 17 containing the X data, another one of the elements scans the cells in memory 17 containing the Y data and the third element scans the cells in memory 17 containing the point number data. Each one of the output legs 19-2 also has three corresponding ganged contact elements, one for transmitting X data, another for transmitting Y data and the third for transmitting point number data. For simplicity the individual contact elements in each leg of legs 19-1 and 19-2 are not shown.

Peak detector unit 21 is implemented by four peak detectors labelled PD1, PD2, PD3 and PD4. Peak detector PD1 receives the three signals transmitted along the three output legs 19-2 of scanner 19 from the contact elements in legs 19-1 scanning the X components and determines if the X component of the signal along the middle leg is greater than the X component of the signal transmitted along the top leg and also greater than the signal transmitted along the bottom leg. Peak detector PD2 receives the same three signals and determines if the X component of the signal in the middle leg is less than the signal in the top leg and also less than the signal in the bottom leg. Peak detectors PD3 and PD4 perform similar functions for the Y coordinates of the signals transmitted along the three legs.

First, scanner 19 is set so that the top leg of legs 19-1 is not over a cell, the middle leg is at the cell having point P1 and the bottom leg is at the cell having point P2. Then scanner 19 is set so that the three input legs 19-1 are at locations containing points P1, P2 and P3, then so that the three input legs 19-1 are at locations containing points P2, P3 and P4, then at points P3, P4 and P5 and so forth. In the last instance the upper leg of legs 19-1 is at point P22, the middle leg is at point P23 and the bottom leg is not over a cell location. Thus, each point may be compared to its adjacent points.

As can be seen in FIG. 3, peak detector PD1 includes a pair of comparators 23 and 25. Comparator 23 compares the X value of the first point Xa (the point transmitted in the upper leg of legs 19-2) with the X value of the second point Xb (the point transmitted in the middle leg of legs 19-2) to see if the X value of the second point is greater than the X value of the first point. Comparator 25 determines if the X coordinate of the second point Xb is greater than the X value of the third point XC. Peak detector PD2 is similar in construction to peak detector PD1 but is connected to determine if the X value of the signal in the middle leg is less than the X value of the signals transmitted in with the top and bottom legs. Peak detectors PD3 and PD4 are identical to peak detectors PD1 and PD2 respectively.

Each point that meets the requirements of any one of peak detectors PD1 through PD4, i.e. has either an X component or a Y component that is either greater than or less than the corresponding components in either point adjacent to it, for any one of the scanner settings constitutes a local extrema point. A signal indicating this is sent by peak detector unit 21 to control unit 12. Control unit 12 causes scanner 19 to transmit that point over line 26 to scanner 27. Points received by scanner 27 are fed into successive locations in a second memory 29. As can be seen, the first and last points in the stroke will always be identified as local extrema points. In the embodiment shown, points P1, P4, P7, P11, P17 and P23 are determined by peak detector unit 21 to be local extrema points of the stroke and are stored accordingly in succession in second memory 29. Points that are not local extrema are not stored in second memory 29. Thus, second memory 29 contains only points P1, P4, P7, P11, P17 and P23. Second memory 29 may also be a random access type memory.

The points stored in second memory 29, are then processed to determine which one of the points is the end point at the first end or start of the stroke. The point stored in the first location in second memory 29, i.e., point P1, is fed by a line 30 into a difference calculator 31. A scanner 33 having two input legs 33-1 and 33-2 which are ganged together and two output lines 34 and 36 scans the successive locations in second memory in sequence. Leg 33-1 is coupled to output line 34 and leg 33-2 is coupled to output line 36. The signal from the top leg 33-1 is transmitted via line 34 to a gate 35 and the signal from bottom leg 33-2 is transmitted via line 36 into difference calculator 31. Scanner 33 is first set so that leg 33-1 transmits the signal of point P1 which is then sent to gate 35 and so that leg 33-2 transmits the signal of point P4 which is sent to difference calculator 31. Then scanner 33 is set to transmit the signals of points P4 and P7 to gate 35 and difference calculator 31 respectively, then points P7 and P11 and so forth. The output signal of difference calculator 31 at each instance is fed into a comparator 37 which compares the output signal of difference calculator 31 with a threshold value K. If the result is below the threshold, then scanner 33 is advanced so that the next set of points are fed to gate 35 and difference calculator 31. The process is repeated until the signal fed into comparator 37 from difference calculator 31 exceeds the threshold K.

When the threshold value K is exceeded, comparator 37 sends an enabling signal to gate 35 causing the signal sent out by scanner 33 over line 34 to be sent to control unit 12, the signal sent corresponding to the point determined to be the end point of the start of the stroke. In the illustrative embodiment, point P11 is determined to be the end point at the start of the stroke and is sent to control unit 12.

Difference calculator 31, which is shown in more detail in FIG. 4, includes a subtractor 39 which subtracts the X value Xa of the point loaded into it from the leg 33-2 of scanner 33 with the X value of first point P1, a squarer 41 which squares the output of subtractor 39, a subtractor 43 which subtracts the Y value Ya of the point loaded into it from the leg 33-2 of scanner 33 with the Y value of first point P1 and a square 45 which squares the output of subtractor 43. An adder 47 sums the outputs of squares 41 and 45 and a square root circuit 49 calculates the square root of the output of adder 47. The output of square root circuit 49 is fed into comparator 37.

The threshold signal K is a selected predetermined value, dependent on the nature of the stroke. If the stroke is a stroke of a character then the threshold value may be a percentage, such as 2 or 3% of the expected maximum size of the stroke. On the other hand if the stroke is a stroke of graphic material, which will generally be many times larger than the stroke of a character, then the threshold value may be a percentage such as 50% of the size of the smallest expected stroke.

The end point at the other end or finish of the stroke is determined in a manner similar to that used in determining the end point at the start of the stroke. Thus, system 11 further includes a scanner 51, a difference calculator 53, a switch 52 for coupling difference calculator 53 to the cell location in second memory 29 containing the last point (i.e. point 23), a comparator 55 and a gate 57 which correspond to elements 33, 31, 37 and 35 but which are arranged to process the points in a reverse direction along the stroke starting which point P23 rather than in a forward direction starting with point P1. The signal passed by gate 57 corresponding to the end point at the finish of the stroke is transmitted to control unit 12.

Control unit 12 then instructs scanner 19 to scan first memory 17 using leg 19-3 starting at point P11 and terminating at point P23. The data so obtained is then fed by scanner 19, using leg 19-4, into successive locations in a third memory 59, which may also be a random access memory. Thus, third memory 59 comprises only points P11 through P23. As can be appreciated, third memory 59 contains the data of the points of the stroke with the corrected end points. The data contained in third memory 59 may then be further processed as desired and/or stored and/or displayed.

Instead of taking the square root of the sums of the differences of the X and Y components for pairs of points, difference calculator may be implemented to measure "city block" distances, i.e. the sum of the difference of the two X components and the two Y components. Also, the square root circuit 49 may be eliminated by squaring the predetermined K value. Also, the difference calculators may be constructed to process polar coordinates if polar coordinates are used in the peak detector unit 21 (to determine local extrema points based on radial distances) rather than Cartesian coordinates. Furthermore, instead of using separate sub-systems to find the end point at each end a single sub-system may be employed which would first locate the end point at one end and then locate the end point at the other end, using appropriate switches and so forth.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of processing a first series of signals representing a stroke of a writing instrument on a writing surface to minimize signals caused by noise at the start and finish of the stroke, said first series of signals corresponding to the x and y coordinates of a series of points along the length of travel of the stroke, the method comprising:
   a. comparing said signals in said first series relative to each other to form a second series of siganls, said second series of signals comprising only signals corresponding to local extrema points of said stroke,
   b. comparing a first signal in said second series with each succeeding signal in said second series to identify a furthest signal from said signal that is within a predetermined distance from said first signal, said signal so identified constituting an end point at the start of the stroke,
   c. comparing the last signal in said second series with each preceeding signal to said second series to identify a furthest signal from said last signal that is within a predetermined distance from said last signal, said signal so identified constituting an end point at the finish of the stroke, and
   d. forming a third series of signals from the first series of signals starting with the signal corresponding to the processed end point at the start of the stroke and terminating with the signal corresponding to the processed end point at the finish of the stroke.

2. The method of claim 1 and wherein said first series of signals are digital signals.

3. The method of claim 1 and wherein comparing said signals in said first series relative to each other to form a second series of signals comprises determining each point in said first series having a more extreme ordinate value than either point adjacent to it.

4. The method of claim 1 and wherein comparing the first signal in said second series with each succeeding signal in said second series to identify the furthest signal from said first signal that is within a predetermined distance from said first signal comprises:
   a. determining the difference in the X coordinate of the first point with a subsequent point and the difference in the Y coordinate of the first point with the same subsequent point,
   b. squaring each of said differences,
   c. summing the squares of said differences, and
   d. comparing the sum of the squares of the differences with a threshold value.

5. Apparatus for processing a first series of signals representing a stroke of a writing instrument on a writing surface to remove signals caused by noise at the start and finish of the stroke, said first series of signals corresponding to the X and Y coordinates of a series of points along the length of travel of the stroke, said apparatus comprising:
   a. means for comparing said signals in said first series relative to each other to form a second series of signals, said second series of signals comprising only signals corresponding to local extrema points of said stroke,
   b. means for comparing the first signal in said second series with each succeeding signal in said second series to identify a furthest signal from said first signal that is within a predetermined distance from said first signal, said signal so identified constituting an end point at the start of the stroke,
   c. means for comparing the last signal in said second series with each preceeding signal in said second series to identify a furthest signal from said last signal that is within a predetermined distance from said last signal, said signal so identified constituting an end point at the finish of the stroke, and
   d. means for forming a third series of signals from the first series of signals starting with the signal corresponding to the processed end point at the start of the stroke and terminating with the signal corresponding to the processed end point at the finish of the stroke.

6. The apparatus of claim 5 and wherein said means for comparing said signals in said first series relative to each other to form a second series of signals comprises a peak detector unit for the X and Y coordinates of three successive points at a time and producing an output signal corresponding to the second of such a points if either its X or Y coordinate is more extreme than the X and Y coordinates of the first and third points.

7. Apparatus for use in processing a first series of digital signals emitted by a digitizing tablet representing the positions of a stylus during a stroke on the tablet to minimize noise at an end of the stroke comprising:
   a. means for comparing the signals representing each position with the signals representing positions adjacent thereto to form a second series of signals comprising only these signals from said first series representing positions having an ordinate value more extreme that the corresponding ordinate value of the signals representing positions adjacent thereto,
   b. means for comparing the first signal in the second series of signals at that end of the stroke with each suceeding signal in said second series to determine a furthest signal from said first signal that is within a predetermined threshold, and
   c. means for forming a third series of signals from said first series but starting with said furthest signal from said first signal that is within said predetermined threshold.

8. A method for use in processing a first series of digital signals emitted by a digitizing tablet representing the positions of a stylus during a stroke on the tablet to minimize noise at an end of the stroke comprising:
   a. comparing the signals representing each position relative to each other to form a second series of signals comprising only those signals from said first series representing positions having an ordinate value more extreme than the corresponding ordinate value of the signals representing positions adjacent thereto,
   b. comparing the first signal in the second series of signals at that end of the stroke with each succeeding signal in said second series to determine a furthest signal from said first signal that is within a predetermined threshold, and
   c. forming a third series of signals from said first series but starting with said furthest signal from said first signal that is within said predetermined threshold.

9. Apparatus for processing a series of periodically occuring digital signals representing the positions of a stylus during a stroke on a digitizing tablet comprising:
   a. first memory means for storing said series of signals,
   b. first scanning means for controlling a transfer of signals to said first memory means so that said signals are scanned sequentially in accordance with their time of occurrence,
   c. peak detector unit means for comparing three successive signals at a time to determine if the second signal is more extreme than either the first or the third signal and outputting only such signals that meet such requirements,
   d. second scanning means for controlling a transfer of signals from the first memory means to the peak detector unit means,
   e. second memory means for holding the signals emitted by the peak detector unit means,
   f. third scanning means for controlling a transfer of signals from the peak detector unit means to the second memory means so that they are loaded therein sequentially, and
   g. means for processing the signals in the second memory means for determining a furthest signal from the first signal stored therein that is within a predetermined threshold.

* * * * *